(12) United States Patent
Yatsuda

(10) Patent No.: US 7,461,890 B2
(45) Date of Patent: Dec. 9, 2008

(54) VEHICLE FRONT BODY STRUCTURE

(75) Inventor: Eiji Yatsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 11/701,606

(22) Filed: Feb. 2, 2007

(65) Prior Publication Data

US 2007/0252412 A1   Nov. 1, 2007

(30) Foreign Application Priority Data

Apr. 27, 2006   (JP) ............................. 2006-124339

(51) Int. Cl.
*B62D 21/02* (2006.01)
*B62D 25/00* (2006.01)
(52) U.S. Cl. ................................. 296/203.02
(58) Field of Classification Search ............ 296/203.02, 296/203.01, 204, 205, 187.03, 187.08, 187.09, 296/193.07, 193.09
See application file for complete search history.

(56) References Cited

U.S. PATENT DOCUMENTS

| | | | | |
|---|---|---|---|---|
| 4,440,435 A | * | 4/1984 | Norlin | 296/187.09 |
| 5,303,973 A | * | 4/1994 | Fujii | 296/203.02 |
| 5,560,674 A | * | 10/1996 | Tazaki et al. | 296/193.01 |
| 6,598,933 B2 | * | 7/2003 | Taguchi et al. | 296/203.02 |
| 6,644,725 B2 | * | 11/2003 | Braitmaier et al. | 296/203.03 |
| 2004/0189055 A1 | * | 9/2004 | Tomita | 296/203.02 |
| 2005/0077711 A1 | | 4/2005 | Yasui et al. | |
| 2005/0088015 A1 | * | 4/2005 | Kishikawa et al. | 296/193.09 |
| 2007/0176443 A1 | * | 8/2007 | Yasuhara et al. | 293/133 |
| 2008/0122255 A1 | * | 5/2008 | Tamakoshi et al. | 296/187.08 |

FOREIGN PATENT DOCUMENTS

JP   2005-112173   4/2005

* cited by examiner

*Primary Examiner*—H Gutman
(74) *Attorney, Agent, or Firm*—Carrier, Blackman & Associates, P.C.; Joseph P. Carrier; William D. Blackman

(57) ABSTRACT

A vehicle front body structure includes left and right diagonal connecting members extending diagonally between and connecting together the lower end portions of left and right legs and the front end portions of left and right upper members. Left and right horizontal connecting members, the left and right legs and the left and right diagonal connecting members together form left and right frame sections of substantially triangular hollow prismoidal configuration having an axis extending in the longitudinal direction of the vehicle body.

11 Claims, 10 Drawing Sheets

VEHICLE FRONT BODY STRUCTURE

FIELD OF THE INVENTION

The present invention relates to a vehicle front body structure for an automobile including a front side frame having a leg portion at a front end thereof and a sub-frame connected to a bottom surface of the leg portion for supporting a front suspension.

BACKGROUND OF THE INVENTION

Vehicle front body structures of the type concerned are known as disclosed, for example, in Japanese Patent Laid-open Publication (JP-A) No. 2005-112173. The disclosed vehicle front body structure includes a front side frame extending in a longitudinal direction of a vehicle body, a front pillar disposed upwardly and rearward of the front side frame, an upper member extending from a lower end of the front pillar in a forward direction of the vehicle body to the position located laterally outward of a front end portion of the front side frame. The upper member has a substantially rectilinear configuration and is arranged to slope upward in a rearward direction of the vehicle body.

By virtue of the rectilinear configuration, the upper member is rigid enough to withstand a force or load applied to a front end portion thereof in a backward direction of the vehicle body. Furthermore, since the upper member is arranged to slope upward toward the lower end of the front pillar, the load applied to the front end portion of the upper member is effectively distributed through the upper member to the front pillar and eventually born by the front pillar. The load can thus be absorbed efficiently.

The front side frame includes downwardly projecting leg portions to which a sub-frame is connected for mounting an engine, a transmission and other components thereon. Left and right front suspensions are attached to the sub-frame for supporting the vehicle body and insulating the same from road socks transmitted by left and right front road wheels.

With the vehicle front body structure thus arranged, when the vehicle is making a turn in either direction, the left and right front road wheels are subjected to lateral loads acting in a widthwise direction of the vehicle body. The lateral loads are transmitted through the respective front suspensions and the sub-frame to lower parts of the leg portions of the front side frames, tending to tilt or bend the leg portions sideways. To deal with this problem, the leg portion must be reinforced by an anti-tilt stay, which will, however, increase the overall weight of the vehicle body.

It is accordingly an object of the present invention to provide a vehicle front body structure which is highly rigid enough to withstand lateral loads applied during turning of the vehicle and also capable of reducing the weight of the vehicle body.

SUMMARY OF THE INVENTION

According to the present invention, there is provided a vehicle front body structure for a motor vehicle, comprising: left and right front side frames extending in a longitudinal direction of a body of the vehicle; left and right front pillars disposed upwardly and rearward of the left and right front side frames; left and right upper members extending respectively from lower ends ($24a$, $31a$) of the left and right front pillars to positions located outward of respective front end portions of the left and right front side frames in a widthwise direction of the vehicle body; left and right horizontal connecting members connecting together the front end portions of the left and right front side frames and front end portions of the left and right upper members; left and right legs extending vertically downward from the front end portions of the left and right front side frames; a sub-frame attached to lower end portions of the left and right legs; and left and right front suspensions connected to the sub-frame for supporting left and right front road wheels, respectively. The vehicle front body structure further comprises left and right diagonal connecting members extending diagonally between and connecting together the lower end portions of the left and right legs and the front end portions of the left and right upper members, wherein the left and right horizontal connecting members, the left and right legs and the left and right diagonal connecting members together form left and right frame sections of substantially triangular hollow prismoidal configuration having an axis extending in the longitudinal direction of the vehicle body.

With this arrangement, since each of the left and right legs constitutes a structural component of the substantially triangular hollow prismoidal frame section, the lefts themselves can maintain a desired degree of rigidity. When the vehicle front body structure is subjected to a lateral load acting on the lower end portion of each leg, the lateral load is transmitted through the diagonal connecting member to the front end portion of the corresponding upper member. In this instance, since the front end portion of the upper member is connected via the horizontal connecting member to the front end portion of the corresponding front side frame, the lateral load can be effectively born by the front end portion of the upper member. By thus distributing the lateral load over the entire area of the frame section, the leg is able to retain a desired degree of rigidity which is large enough to withstand the lateral load without yielding or tilting in a lateral outward direction of the vehicle body. Furthermore, since the lateral load acting on the lower end portion of each leg is distributed to the front end portion $25a$ of the corresponding upper member, the leg is allowed to use a relatively thin sheet metal for the production thereof. This will contribute to the reduction of the weight of the vehicle body including the vehicle front body structure.

Preferably, each of the left and right diagonal connecting members comprises a pair of diagonal braces spaced a predetermined distance in the longitudinal direction of the vehicle body. The vehicle front body structure may further comprise a windshield washer tank, an intercooler, or an intake duct, which is installed in a mount space defined between the pair of diagonal braces. By thus using the mount space defined in each of the left and right frame sections, it is no longer necessary to provide a separate space for installation of a vehicle part component, which would lead to an increase in the size of the vehicle body.

The vehicle front body structure may further include a front bulkhead disposed between the front end portions of the left and right front side frames. In this instance, the front bulkhead including left and right vertical stays connected to the front end portions of the left and right front side frames and the left and right legs. This arrangement contributes to strengthening of the legs.

In one preferred form of the invention, each of the left and right diagonal connecting members comprises a U-shaped connecting frame including a rectangular sidewall lying in a vertical plane parallel to a longitudinal axis of the vehicle body, and substantially triangular frame-shaped front and rear end walls extending perpendicularly from opposite vertical edges of the rectangular sidewall in a lateral outward direction of the vehicle body. Each of the triangular frame-shaped front and rear end walls includes a diagonal brace extending between and connected to the lower end portion of each of the left and right legs and the front end portion of each of the left and right upper members. The U-shaped connecting frame including the rectangular sidewall and the triangular frame-shaped front and rear end walls has a press-formed one-piece structure. The thus formed connecting frame is rigid in construction and light in weight.

The left and right legs preferably has a generally hollow box-like configuration having one side open toward a lateral outward direction of the vehicle body, and the U-shaped connecting frame is connected to each of the left and right legs such that the open side of the hollow-box-like leg is closed by the sidewall of the connecting frame. With this arrangement, the leg has a closed cross-sectional shape, which is highly rigid against external forces.

BRIEF DESCRIPTION OF THE DRAWINGS

Certain preferred structural embodiments of the present invention will be described in detail herein below, by way of example only, with the reference to the accompanying drawings, in which.

DETAILED DESCRIPTION OF THE PREFERRED EMBODIMENTS

Figure 1:
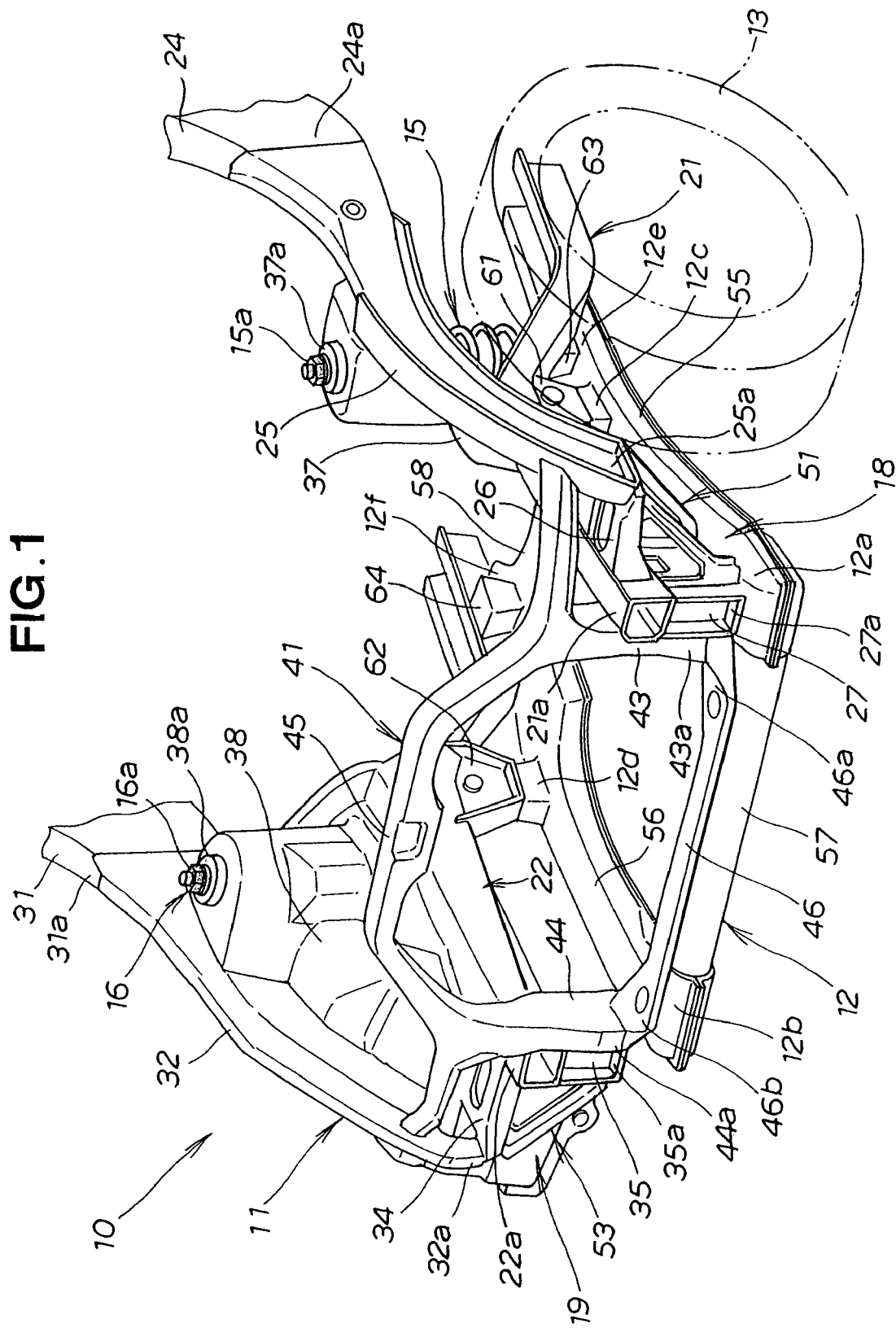
FIG. 1 is a perspective view of a vehicle front body structure according to an embodiment of the present invention.
Figure 2:
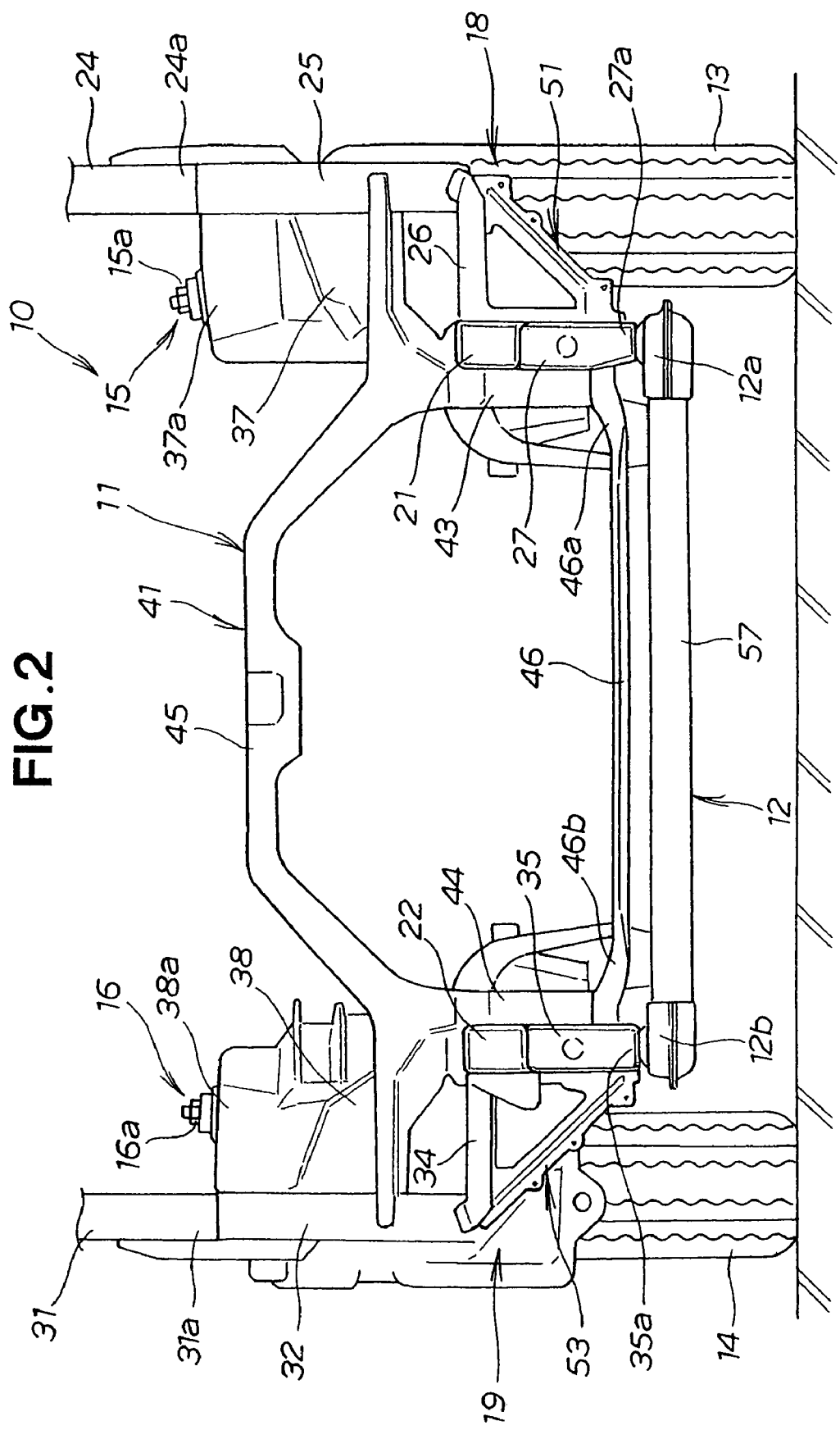
FIG. 2 is a front elevational view of the vehicle front body structure.

Referring now to the drawings and FIGS. 1 and 2 in particular, there is shown a vehicle front body structure 10 of a motor vehicle according to one preferred embodiment of the present invention. The vehicle body structure 10 generally comprises a main frame 11 forming a main part of the vehicle front body structure 10, a sub-frame 12 disposed below the main body 11, and left and right front suspensions 15 and 16 for supporting left and right front road wheels 13 and 14 (FIG. 2).

The main frame 11 includes left and right front side frames 21 and 22 extending in a longitudinal direction of a body of the motor vehicle, left and right front pillars 24 and 31 disposed upwardly and rearward of the left and right front side frames 21, 22, respectively, left and right upper members 25 and 32 extending from respective lower ends 24a and 31a of the left and right front pillars 24, 31 in a forward direction of the vehicle body to positions located outward of respective front end portions 21a and 22a of the left and right front side frames 21, 22 in a widthwise direction of the vehicle body, left and right horizontal connecting portions or members 26 and 34 connecting respective front end portions 25a and 32a of the left and right upper members 25, 35 and the front end portions 21a, 22a of the left and right front side frames 21, 22, and left and right front legs 27 and 35 extending vertically downward from the front end portions 21a, 21b of the left and right front side frames 21, 22.

The main frame 11 further includes a left wheel house 37 extending between the left upper member 25 and the left front side frame 21 so as to cover upper and inner parts of the left front road wheel 13, a right wheel house 38 extending between the right upper member 32 and the right front side frame 22 so as to cover upper and inner parts of the right front road wheel 14 (FIG. 2), and a front bulkhead 41 disposed between the front end portions 21a, 22a of the left and right front side frames 21, 22.

The front bulkhead 41 includes left and right vertical stays 43 and 44 connected to the front end portions 21a, 22a of the left and right front side frames 21, 22, an upper bulkhead frame member 45 extending transversely between upper ends of the left and right vertical stays 43, 44 and connected to the front end portions 25a, 32a of the left and right upper members 25, 32, and a lower bulkhead frame member 46 extending transversely between lower ends 43a, 44a of the left and right vertical stays 43, 44. The lower bulkhead frame member 46 has opposite ends 46a and 46b connected to the lower ends 43a, 44a of the left and right vertical stays 43, 44. The left and right vertical stays 43, 44 and the upper bulkhead frame member 45 are integral with each other and have a pressed-formed one-piece structure.

The main frame 11 further includes a left diagonal connecting member 51 extending diagonally between and connecting together a lower end portion 27a of the left front leg 27 and the front end portion 25a of the left upper member 25, and a right diagonal connecting member 53 extending diagonally between and connecting together a lower end portion 35a of the right front leg 35 and the front end portion 32a of the right upper member 32. The left horizontal connecting member 26, the left front leg 27 and the left diagonal connecting member 51 together form a left frame section 18 of substantially triangular hollow prismoidal configuration having an axis extending in the longitudinal direction of the vehicle body. Similarly, the right horizontal connecting member 34, the right front leg 35 and the right diagonal connecting member 53 together form a right frame section 19 of substantially triangular hollow prismoidal configuration having an axis extending in the longitudinal direction of the vehicle body.

The sub-frame 12 has a substantially rectangular hollow shape and includes left and right side frame members 55 and 56 extending in the longitudinal direction of the vehicle body, a front cross-member 57 connecting the left and right side frame members 55, 56 at front ends thereof, and a rear cross-member 58 connecting the left and right side frame members 55, 56 at rear ends thereof. The sub-frame 12 has a left front end portion 12a connected to the lower end portion 27a of the left front leg 27, a right front end portion 12b connected to the lower end portion 35a of the right front leg 35, a left central portion 12c connected to a lower end portion of a left central leg 61, a right central portion 12d connected to a lower end portion of a right central leg 62, a left rear end portion 12e connected to a lower end portion of a left rear leg 63, and a right rear end portion 12f connected to a lower end portion of a right rear leg 64.

The left central leg 61 extends vertically downward from a longitudinal central portion of the left front side frame 21, and the right central leg 62 extends vertically downward from a longitudinal central portion of the right front side frame 22. Similarly, the left rear leg 63 extends vertically downward from a rear end portion of the left front side frame 21, and the right rear leg 64 extends vertically downward from a rear end portion of the right front side frame 22.

The left front suspension 15 is mounted on the left side frame member 55 of the sub-frame 12 with its upper end 15a connected to a top portion 37a of the left wheel house 37. Similarly, the right front suspension 16 is mounted on the right side frame member 56 of the sub-frame 12 with its upper end 16a connected to a top portion 38a of the right wheel house 38.

Figure 3:
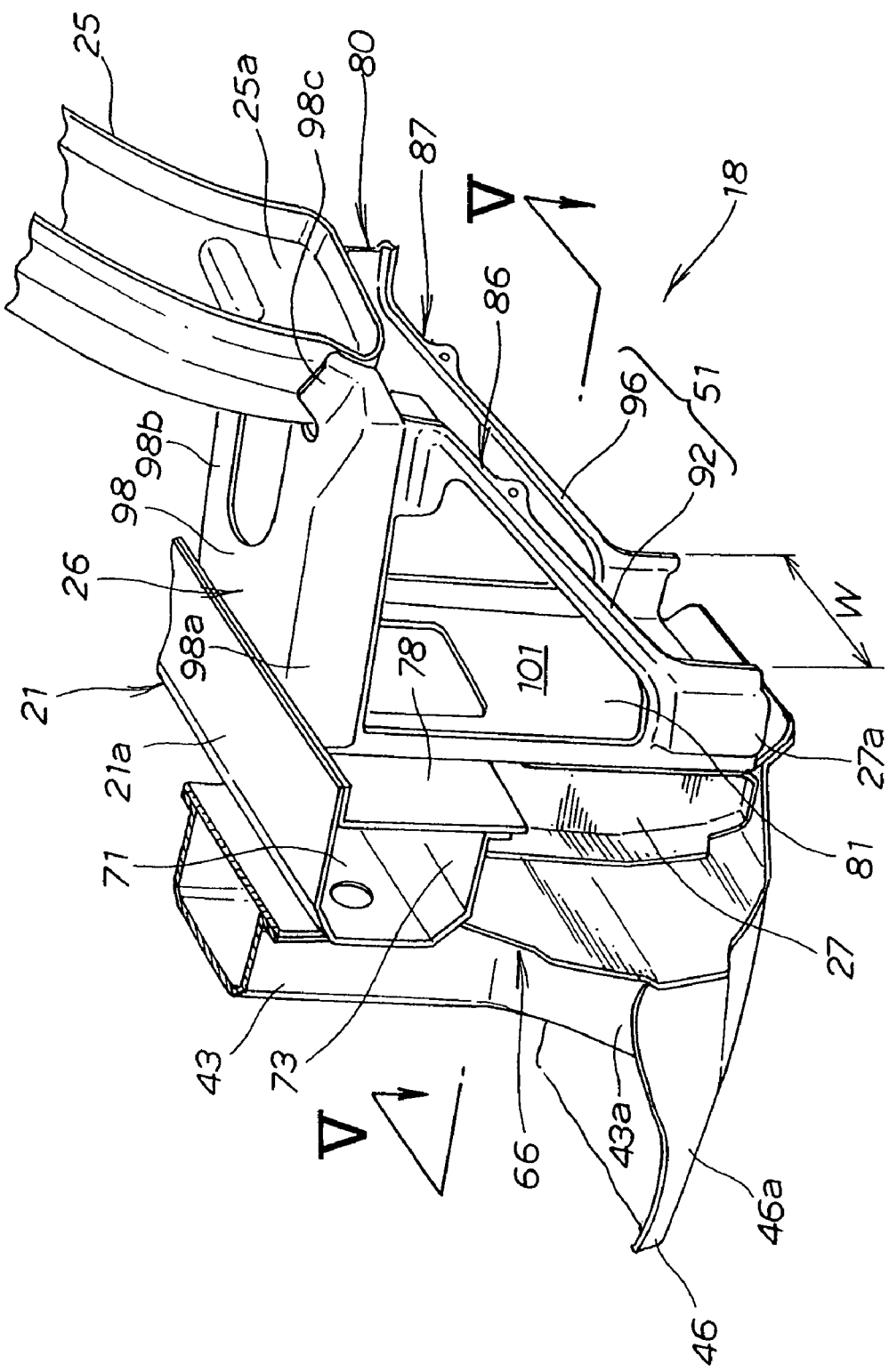
FIG. 3 is a perspective view showing on enlarged scale a left triangular frame portion of the vehicle front body structure.
Figure 4:
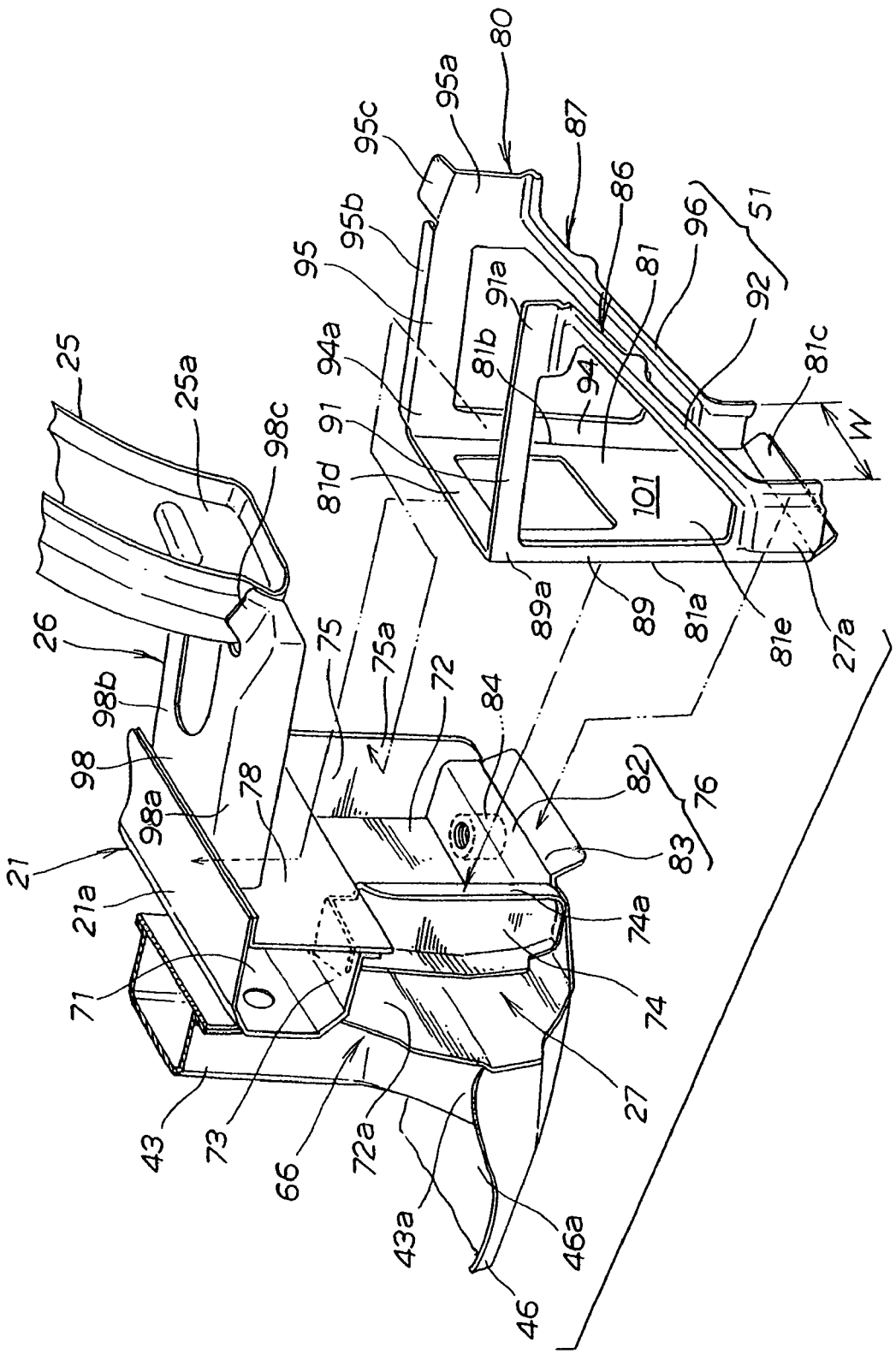
FIG. 4 is an exploded perspective view of the left triangular frame portion.
Figure 5:
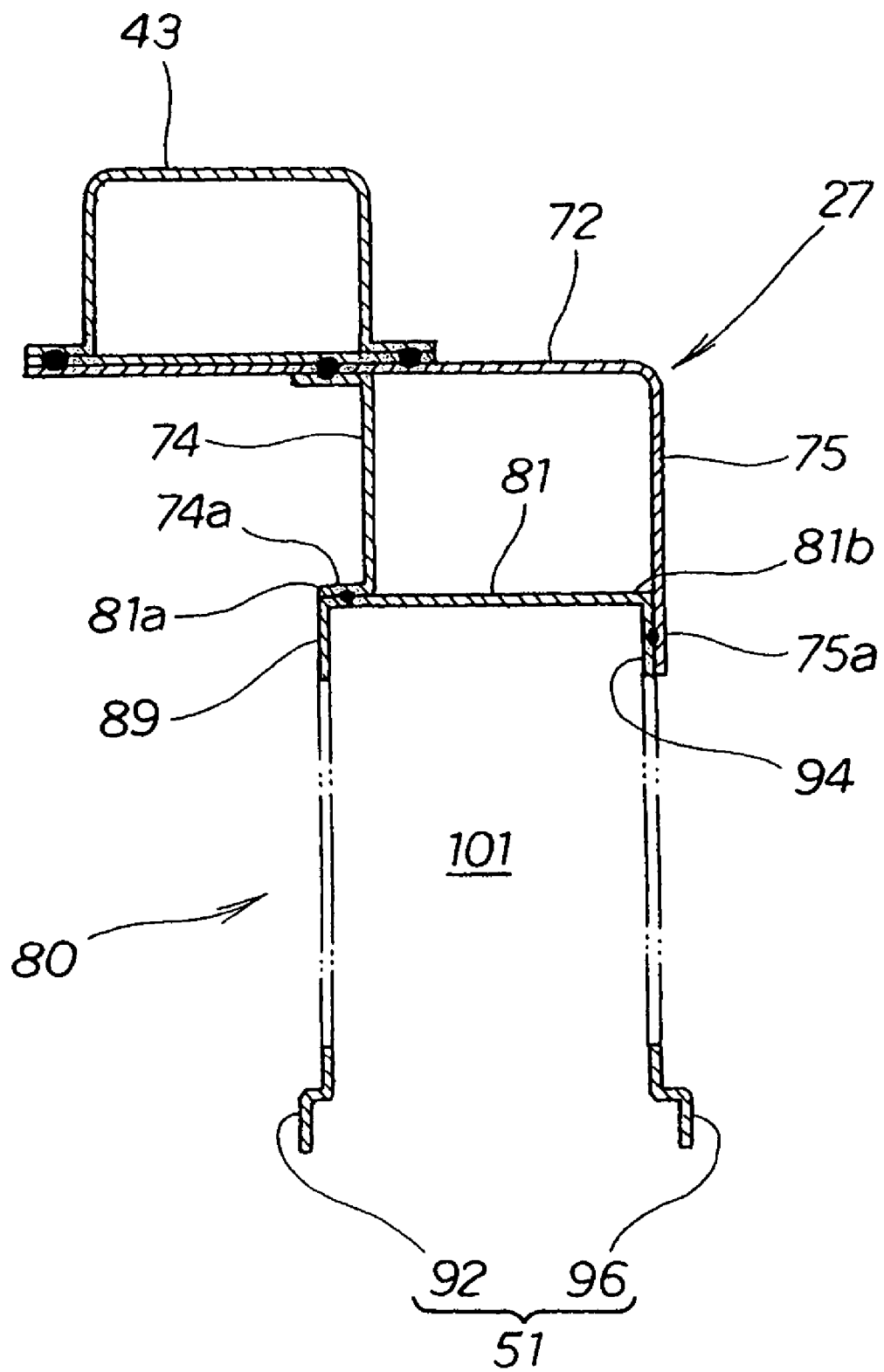
FIG. 5 is a cross-sectional view taken along line V-V of FIG. 3.

As shown in FIG. 3 to 5, the left frame section 18 is formed jointly by the left front leg 27, the left horizontal connecting member 26 and the left diagonal connecting member 51 that are connected or assembled together into a substantially triangular hollow prismoidal configuration having a depth W (FIG. 3) in the longitudinal direction of the vehicle body. Stated more specifically, the left front leg 27 and the front end portion 21a of the left front side frame 21 jointly form a left perpendicular portion or side 66 of the substantially triangular hollow prismoidal frame section 18, the horizontal connecting member 26 forms a horizontal portion or side of the substantially triangular hollow prismoidal frame section 18, and the diagonal connecting member 51 forms a diagonal portion or side of the substantially triangular hollow prismoidal frame section 18. With this arrangement, since the left front leg 27 constitutes a structural component of the substantially triangular hollow prismoidal frame section 18, the left front leg 27 itself can maintain a desired degree of rigidity.

As shown in FIG. 4, the left font leg 27 has a generally hollow box-like configuration including a sidewall 72 extending downward from a bottom wall 73 of the left front side frame 21 in flush with an inner sidewall 71 of the left front side frame 21, a front end wall 74 extending downward from the bottom wall 73 along a front vertical edge of the sidewall 72, a rear end wall 75 extending downward from the bottom wall 73 along a rear vertical edge of the sidewall 72, and a bottom wall 76 extending between the front and rear end walls 74 and 75 along a lower horizontal edge of the sidewall 72. The sidewall 72 has a width substantially equal to the depth W of the left frame section 17. The bottom wall 76 includes a body portion 82 bent into an L-shape, and a reinforcement flange 83 projecting obliquely downward from an outer edge of the body portion 82 of the bottom wall 76. A nut 84 is attached by welding to an undersurface of the body portion 82 of the bottom wall 76 for attachment of the left front end portion 12a (FIG. 1) of the sub-frame 12 to the left front leg 27.

In the illustrated embodiment, the sidewall 72, the rear end wall 75 and the bottom wall 76 are formed integrally with each other. The sidewall 72 has a front end extension 72a projecting forwardly from a plane of the front end wall 74 and joined by welding to the left stay 43. A lateral outer side (left side) of the left front leg 27 is closed by a sidewall 81 of a connecting frame vertical. The sidewall 81 has a substantially rectangular shape.

The connecting frame 80 has a generally U-shaped configuration including the rectangular sidewall 81 lying in a vertical plane parallel to a longitudinal axis of the vehicle body, and front and rear end walls 86 and 87 bent at right angles to the sidewall 81 and extending respectively from front and rear edges 81a and 81b of the rectangular sidewall 81 in a lateral outward direction of the vehicle body. The front and rear end walls 86 and 87 are each formed into a substantially triangular frame-shaped configuration. The connecting frame 80 including the rectangular sidewall 81 and the triangular frame-shaped front end rear end walls 86 and 87 has a press-formed one-piece structure.

The triangular frame-shaped front end wall 86 includes a vertical rim 89 extending along the front edge 81a of the sidewall 81, a top rim 91 extending horizontally from an upper end 89a of the vertical rim 89, and a diagonal rim or brace 92 extending between a lower end of the vertical rim 89 (which forms the lower end portion 27a of the left front leg 27) and an outer end 91a of the top rim 91. The diagonal brace 92 forms part of the diagonal connecting member 51. Similarly, the triangular frame-shaped rear end wall 87 includes a vertical rim 94 extending along the front edge 81b of the sidewall 81, a top rim 95 extending horizontally from an upper end 94a of the vertical rim 94, and a diagonal rim or brace 96 extending between a lower end of the vertical rim 94 (which forms the lower end portion 27a of the left front leg 27) and an outer end 95a of the top rim 95. The diagonal brace 96 also forms part of the diagonal connecting member 51.

In assembly, the connecting frame 80 and the left front side frame 21 including the left front leg 27 are brought together in such a manner that an upper half 81d of the sidewall 81 of the connecting frame 80 is in abutment with the outer sidewall 78 of the left front side frame 21, a lower half 81e of the sidewall 81 is in abutment with a peripheral flange 74a of the front end wall 74 of the left front leg 27, the vertical rim 94 of the rear end wall 87 of the connecting member 80 is in abutment with an inner surface of a peripheral portion 75a of the rear end wall 75 of the left front leg 27, and a lower flange 81c of the sidewall 81 is in abutment with the flange 83 of the bottom wall 76 of the left front leg 27. Those parts of the connecting frame 80, the left front side frame 21 and the left front leg 27, which are bought into abutment with each other, are joined together by spot-welding, as partly shown in FIG. 5. Thus, the sidewall 81 of the connecting frame 80 is firmly connected to the outer sidewall 78 of the left front side frame 21, the front end wall 74 and the bottom wall 76 of the left front leg 27. The rear end wall 87 of the connecting frame 80 is firmly connected to the rear end wall 75 of the left front leg 27.

The left horizontal connecting member 26 includes a flat body 98 extending between the outer sidewall 78 of the left front side frame 21 and the front end portion 25a of the left upper member 25, a front flange 98a bent downward from a front edge of the connecting member body 98 and joined by spot-welding to the top rim 91 of the front end wall 86 of the connecting frame 80, and first and second attachment lugs 98c and 98d (FIG. 9) bent upward from a lateral outer end portion of the connecting member body 98 and joined by spot-welding to the front end portion 25 of the left upper member 25. The flat connecting member body 98 has a rear portion 98b joined by spot-welding to an upper flange 95b of the rear end wall 87 of the connecting frame 80, which is bent rearward from an upper edge of the top rim 95 of the rear end wall 87. The rear end wall 87 of the connecting frame 80 further has an attachment lug 95c bent rearward from an outer end portion of the upper edge of the top rim 95 and joined by spot-welding to the front end portion 25a of the left upper member 25.

The left diagonal connecting member 51 is comprised of the diagonal brace 92 of the front end wall 86 of the connecting frame 80 and the diagonal brace 96 of the rear end wall 87 of the connecting frame 80. The front and rear diagonal braces 92 and 96 are spaced from each other in the longitudinal direction of the vehicle body by a predetermined distance which is equal to the depth W of the substantially triangular hollow prismoidal frame section 18 (FIG. 3). The left diagonal connecting member 51 serves as a reinforcement member extending diagonally between the lower end portion 27a of the left front leg 27 an the front end portion 25a of the left upper member 25.

As thus far explained, the left frame section 18 is a frame of substantially triangular hollow prismoidal configuration having a depth W in the longitudinal direction of the vehicle body. The left frame section 18 includes a left diagonal connecting member 51 extending diagonally between the lower end portion 27a of the left front leg 27 and the front end portion 25a of the left upper member 25. The left diagonal connecting member 51 comprises front and rear diagonal braces 92 and 96 that are spaced in the longitudinal direction of the vehicle body by a distance equal to the depth W of the left frame section 18 so that a space 101 is defined between the front and rear diagonal braces 92 and 96. The space 101 is usable for accommodating within it a vehicle component part, as will be described later with reference to FIGS. 9 and 10.

Figure 6:
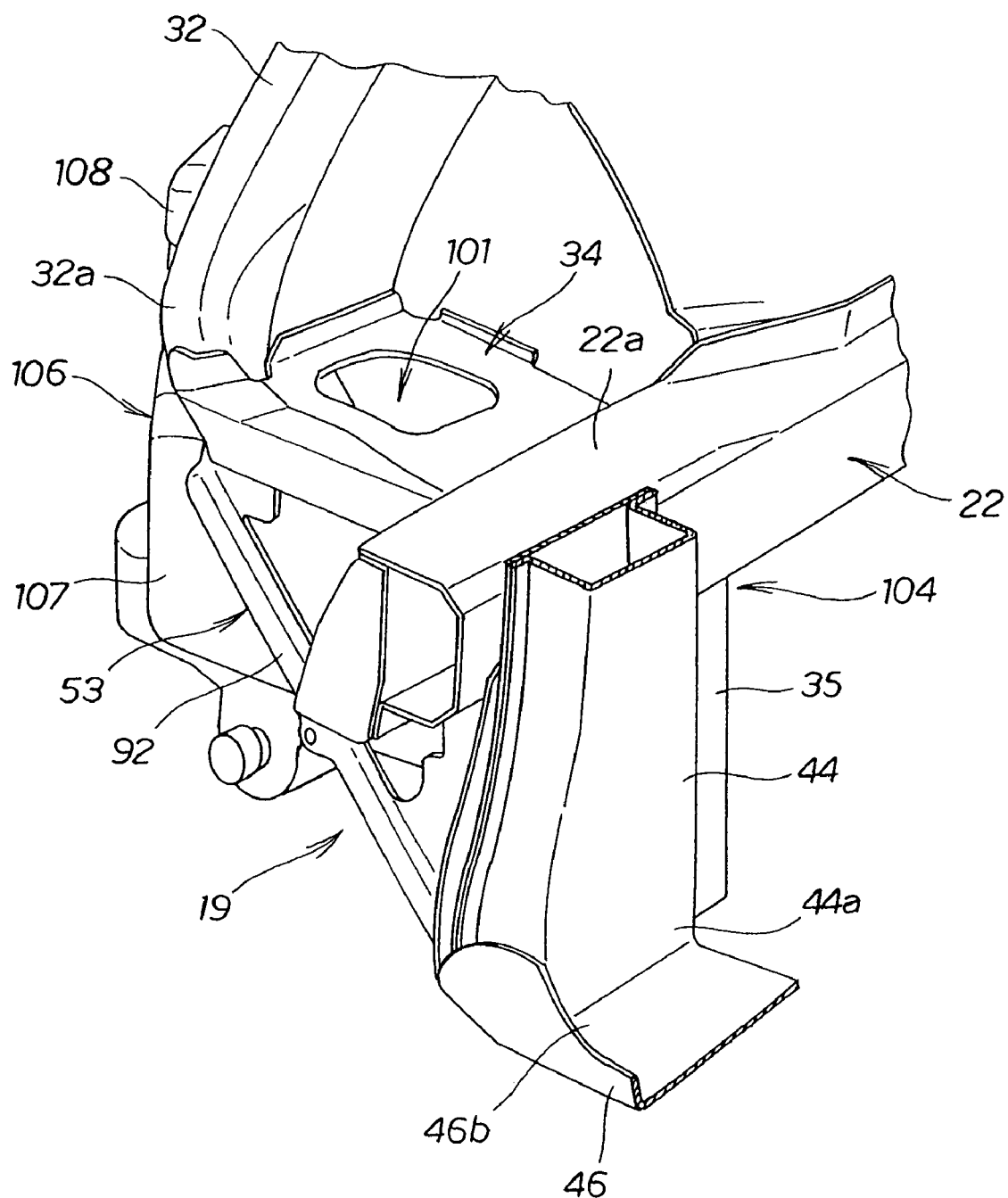
FIG. 6 is a perspective view showing on enlarged scale of a right triangular frame portion of the vehicle front body structure.
Figure 7:
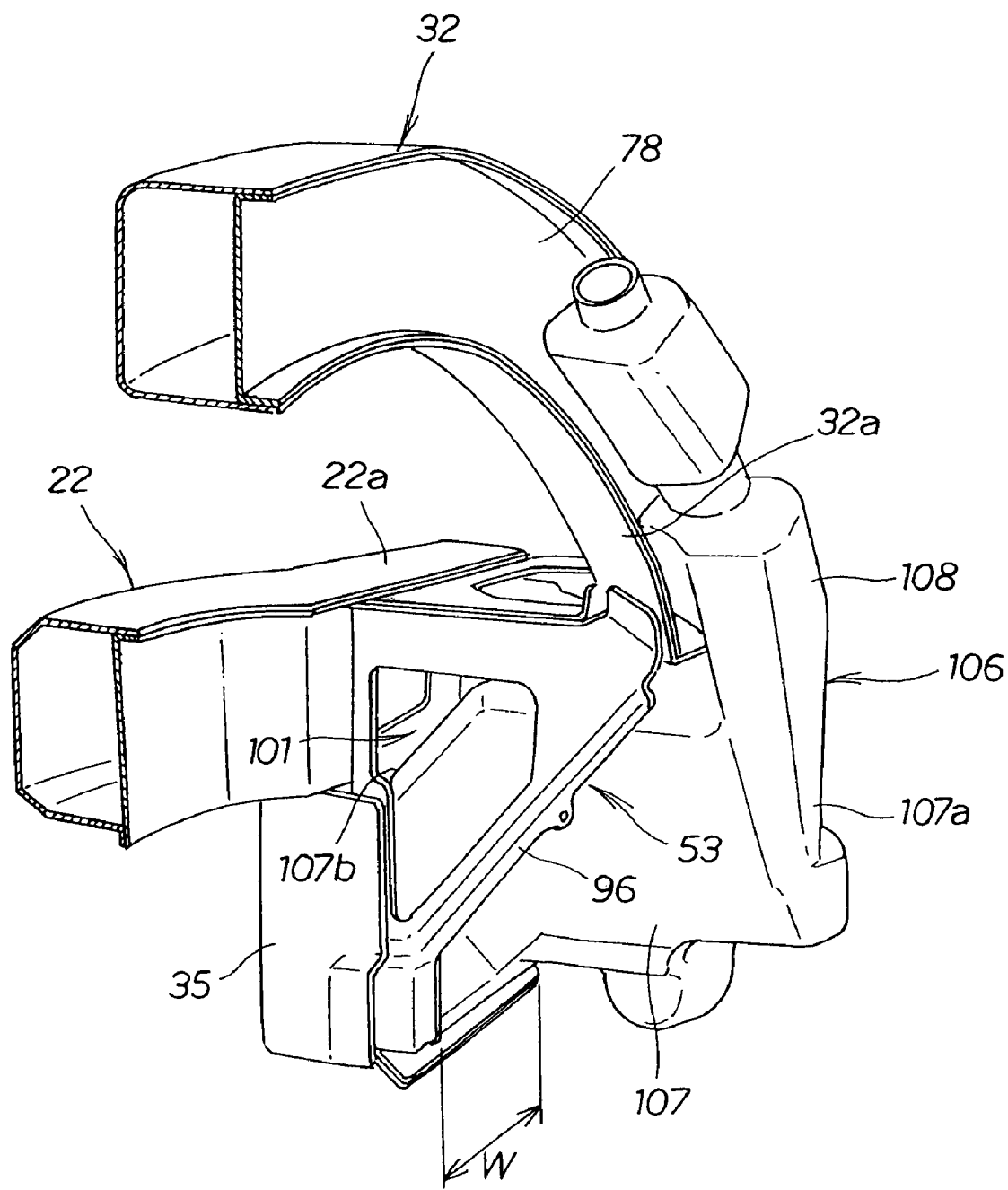
FIG. 7 is a view similar to FIG. 6, but showing the right triangular frame portion looking from the back thereof.

As shown in FIGS. 6 and 7, the right frame section 19 is formed jointly by the right front leg 35, the right horizontal connecting member 34 and the right diagonal connecting member 53 that are connected or assembled together into a substantially triangular hollow prismoidal configuration having a depth W (FIG. 7) in the longitudinal direction of the vehicle body. Stated more specifically, the right front leg 35 and the front end portion 22a of the right front side frame 22 jointly form a right perpendicular portion or side 104 (FIG. 6) of the substantially triangular hollow prismoidal frame section 19, the right horizontal connecting member 34 forms a horizontal portion or side of the substantially triangular hollow prismoidal frame section 19, and the right diagonal connecting member 53 forms a diagonal portion or side of the substantially triangular hollow prismoidal frame section 19. With this arrangement, since the right front leg 35 constitutes a structural component of the substantially triangular hollow prismoidal frame section 19, the right front leg 35 itself can maintain a desired degree of rigidity.

The right frame section 19 is symmetric in construction with the left frame section 18 (FIG. 3) about a central vertical plane of the vehicle body. Thus, these parts of the right horizontal connecting member 34 and the right diagonal connecting member 53, which correspond to those of the left front leg 27, the left horizontal connecting member 26, and the left diagonal connecting member 51, respectively, are identified by the same reference characters and description thereof can be omitted.

The right frame section 19 is a frame of substantially triangular hollow prismoidal configuration having a depth W (FIG. 7) in the longitudinal direction of the vehicle body. The right frame section 19 includes the right diagonal connecting member 53 extending diagonally between the lower end portion of the right front leg 35 and the front end portion 32a of the right upper member 32. The right diagonal connecting member 53 comprises front and rear diagonal braces 92 and 96 that are spaced in the longitudinal direction of the vehicle body by a distance equal to the depth W of the right frame section 19 so that a space 101 is defined between the front and rear diagonal braces 92 and 96. The space 101 is used for accommodating within it a windshield washer tank 106.

The windshield washer tank 106 has a horizontal tank portion 107 of substantially rectangular hollow body and an inclined tank portion 108 extending obliquely and upwardly from a right sidewall 107a of the horizontal tank portion 107 in a backward direction of the vehicle body. The horizontal tank portion 107 forms a body of the windshield washer tank 106 and is received in the mount space 101 defined between the front and rear diagonal braces 92 and 96 such that a left sidewall 107b of the horizontal tank portion 107 is disposed adjacent to the right front side frame 22, and the right sidewall 107a is disposed on a lateral outer side of the right upper member 32. By thus using the mount space 101 defined between the front and rear diagonal braces 92, 96 of the right diagonal connecting member 53, it is readily possible to install the horizontal portion 107 of the windshield washer tank 106 without providing a separate space for installation.

The inclined tank portion 108 of the windshield washer tank 106 is configured to extend along an outer sidewall 78 of the right upper member 32. The outer sidewall 78 of the right upper member 32 has a U-shaped transverse cross section and hence defines a groove. The inclined tank portion 18 is received in the groove of the outer sidewall 78 of the right upper member 32. By thus using the groove formed by the U-shaped outer sidewall 78 in combination with the mount space 101 defined between the front and rear diagonal braces 92, 96, the windshield washer tank 106 can be stably and neatly installed in the vehicle front body structure. The windshield washer tank 106 may be attached by screws to the right frame section 19 in which instance the right frame section 19 serves also as a mounting bracket for the windshield washer tank 106, which contributes to the reduction of the total number of components of the vehicle front body structure.

Operation of the left and right frame sections 18 and 19 will be described below with reference to FIGS. 8A and 8B.

Figure 8A:
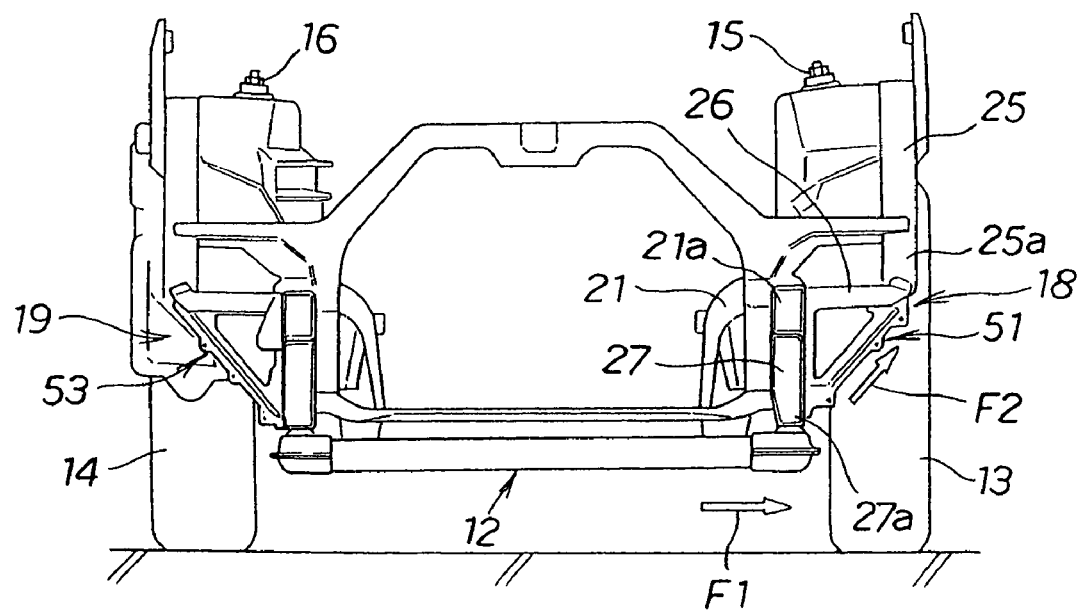
FIG. 8A is a diagrammatical front elevational view illustrative of the manner in which a lateral load applied to the right road wheel is transmitted through the right front suspension to the vehicle front body structure.

As shown in FIG. 8A, when the right front road wheel 14 is subjected to a lateral load while the motor vehicle is making a turn, the lateral load is transmitted from the right front road wheel 14 through the right front suspension 16 and the subframe 12 to the lower end portion 27a of the left front leg 27, as indicated by the profiled arrow F1. The lateral load F1 is partly transmitted from the lower end portion 27a of the left front leg 27 through the left connecting member 51 to the front end portion 25a of the left upper member 25, as indicated by the profiled arrow F2. In this instance, since the front end portion 25a of the left upper member 25 is connected via the left horizontal connecting member 26 to the front end portion 21a of the left front side frame 21, the lateral load F2 can be effectively born by the front end portion 25a of the left upper member 25. By thus distributing the lateral load F1 over the entire area of the left frame section 18, the left front leg 27 is able to retain a desired degree of rigidity which is large enough to withstand the lateral load F1 without yielding or tilting in a lateral outward direction of the vehicle body. Furthermore, since the lateral load F1 acting on the lower end portion 27a of the left front leg 27 is distributed to the front end portion 25a of the left upper member 25, the left front leg 27 is allowed to use a relatively thin sheet metal for the production thereof. This will contribute to the reduction of the weight of the vehicle body including the vehicle front body structure 10 (FIG. 1).

Figure 8B:
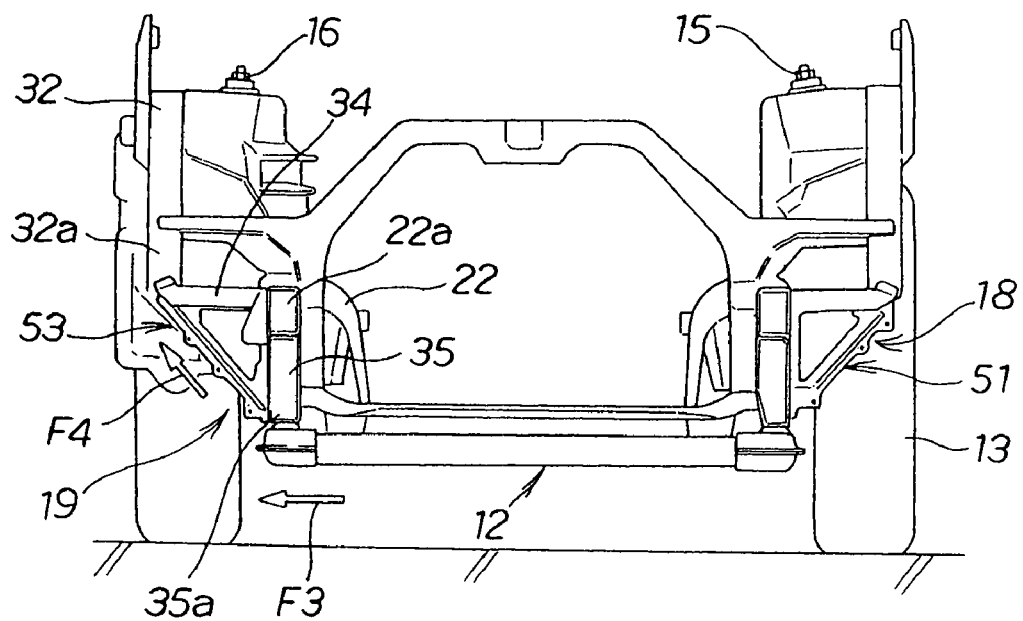
FIG. 8B is a diagrammatical front elevational view illustrative of the manner in which a lateral load applied to the left road wheel is transmitted through the left front suspension to the vehicle front body structure.

Alternatively, when the left front road wheel 13 is subjected to a lateral load while the motor vehicle is making a turn, the lateral load is transmitted from the left front road wheel 13 through the left front suspension 15 and the subframe 12 to the lower end portion 35a of the left front leg 35, as indicated by the profiled arrow F3 shown in FIG. 8B. The lateral load F3 is partly transmitted from the lower end portion 35a of the right front leg 35 through the right connecting member 53 to the front end portion 32a of the right upper member 32, as indicated by the profiled arrow F4. In this instance, since the front end portion 32a of the right upper member 32 is connected via the right horizontal connecting member 34 to the front end portion 22a of the right front side frame 22, the lateral load F4 can be effectively born by the front end portion 32a of the right upper member 32. By thus distributing the lateral load F3 over the entire area of the right frame section 19, the right front leg 35 is able to retain a desired degree of rigidity which is large enough to withstand the lateral load F3 without yielding or tilting in a lateral outward direction of the vehicle body. Furthermore, since the lateral load F1 acting on the lower end portion 35a of the left front leg 35 is distributed to the front end portion 32a of the right upper member 32, the right front leg 35 is allowed to use a relatively thin sheet metal for the production thereof. This will contribute to the reduction of the weight of the vehicle body including the vehicle front body structure 10 (FIG. 1).

Furthermore, the left or the right diagonal connecting member 51, 53 is able to properly sustain an impact force applied at a frontal offset crash with an oncoming vehicle even when the oncoming vehicle has a front bumper disposed at a different height or vertical position from the bumper (not shown) of the own vehicle. The vehicle front body structure 10 (FIG. 1) having such diagonal connecting members 51, 53 is, therefore, able to reduce damage on the own vehicle at the frontal offset crash.

Figure 9:
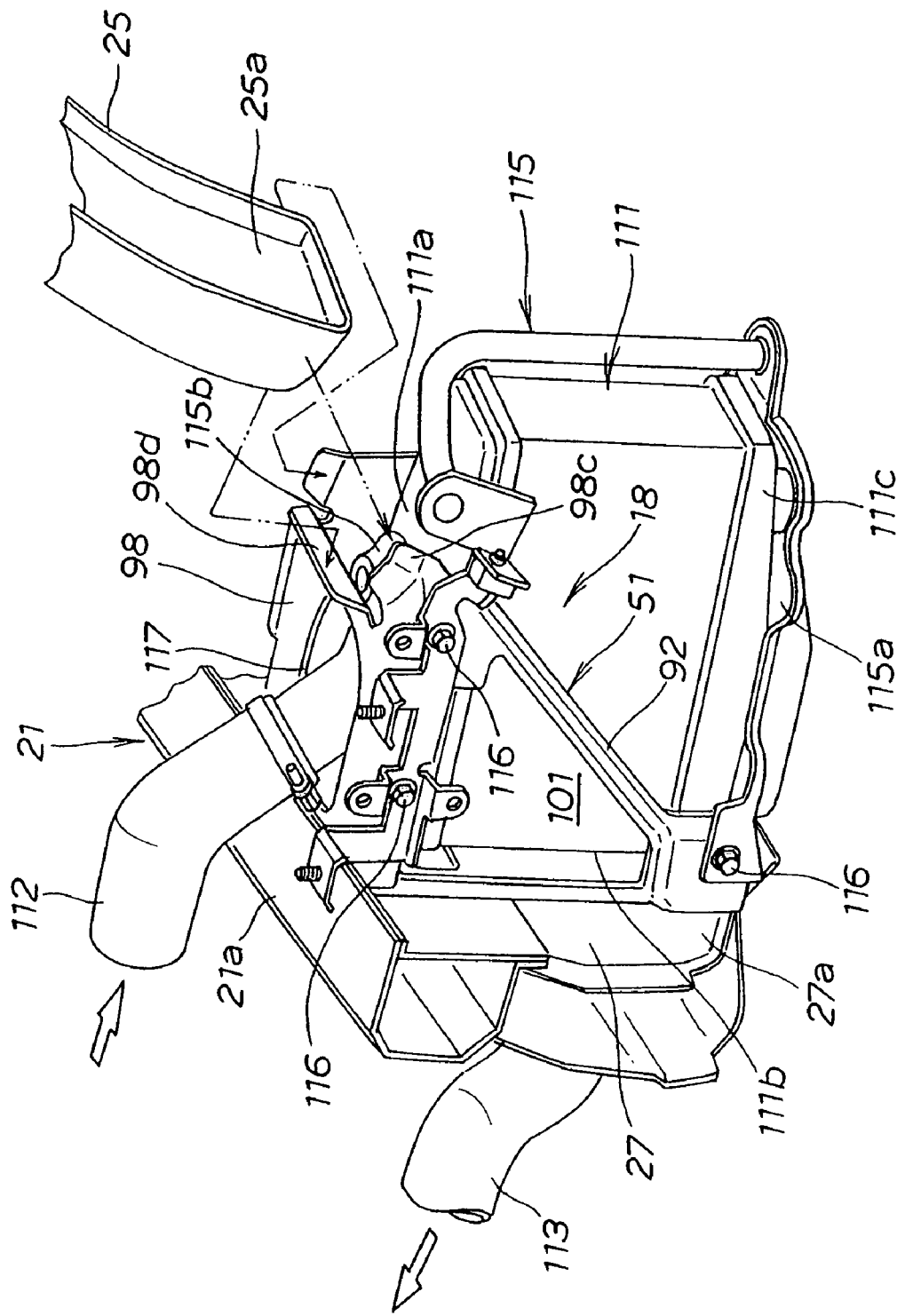
FIG. 9 is a view similar to FIG. 3, but showing the left triangular frame portion used to accommodate an intercooler according to a second embodiment of the present invention.

FIG. 9 shows a second embodiment of the present invention in which an intercooler 111 is disposed in a mount space defined in the left frame section 18 of the vehicle front body structure. The left frame section 18 is formed in a substantially triangular hollow prismoidal configuration having a predetermined depth (see FIG. 3) in the longitudinal direction of the vehicle body. The triangular hollow prismoidal left frame section 18 includes a front diagonal brace 92 and a rear diagonal brace 96 (FIG. 3) that are spaced apart in the longitudinal direction of the vehicle body by a distance substantially equal to the depth W of the left frame section 18. The front and rear diagonal braces 92 and 96 define therebetween a mount space 101 in which the intercooler 111 is received.

The intercooler 111 has a substantially rectangular body and is connected at its upper end portion 111a with an intake hose 112 and, at its inner sidewall 111b, with a discharge hose 112. The intake hose 112 is connected to a turbocharger (not shown), and the discharge hose 113 is connected to an air-cleaner (not shown).

The intercooler 111 received in the mount space 101 defined in the left frame section 18 is immovably supported on a mount bracket 115, which is secured to the left frame section 18 by means of fasteners including screws 116. The left frame section 18 and the mount bracket 115 jointly support the intercooler 111 in an embracing fashion. More specifically, the mount bracket 115 has a bottom member 115a on which a bottom portion 111c of the intercooler 111 is disposed, and a top member 115b to which the upper end portion 111a of the intercooler 111 is attached. The intake hose 112 extends from the upper end portion 111a of the intercooler 111 through an opening 117 in the horizontal connecting member body 98 to the turbocharger.

By thus using the mount space 101 defined in the left frame section 18, it is not necessary to provide a separate space for installation for the intercooler 111, which may enlarge the overall size of the vehicle body. Furthermore, since the mount bracket 115 is attached by the screws 116 to the left frame section 18 and since the mount bracket 115 and the left frame section 18 jointly support the intercooler 111, the left frame section 18 serves also as a mount bracket. This arrangement contributes to the reduction of the number of components of the front vehicle body structure 10.

Figure 10:
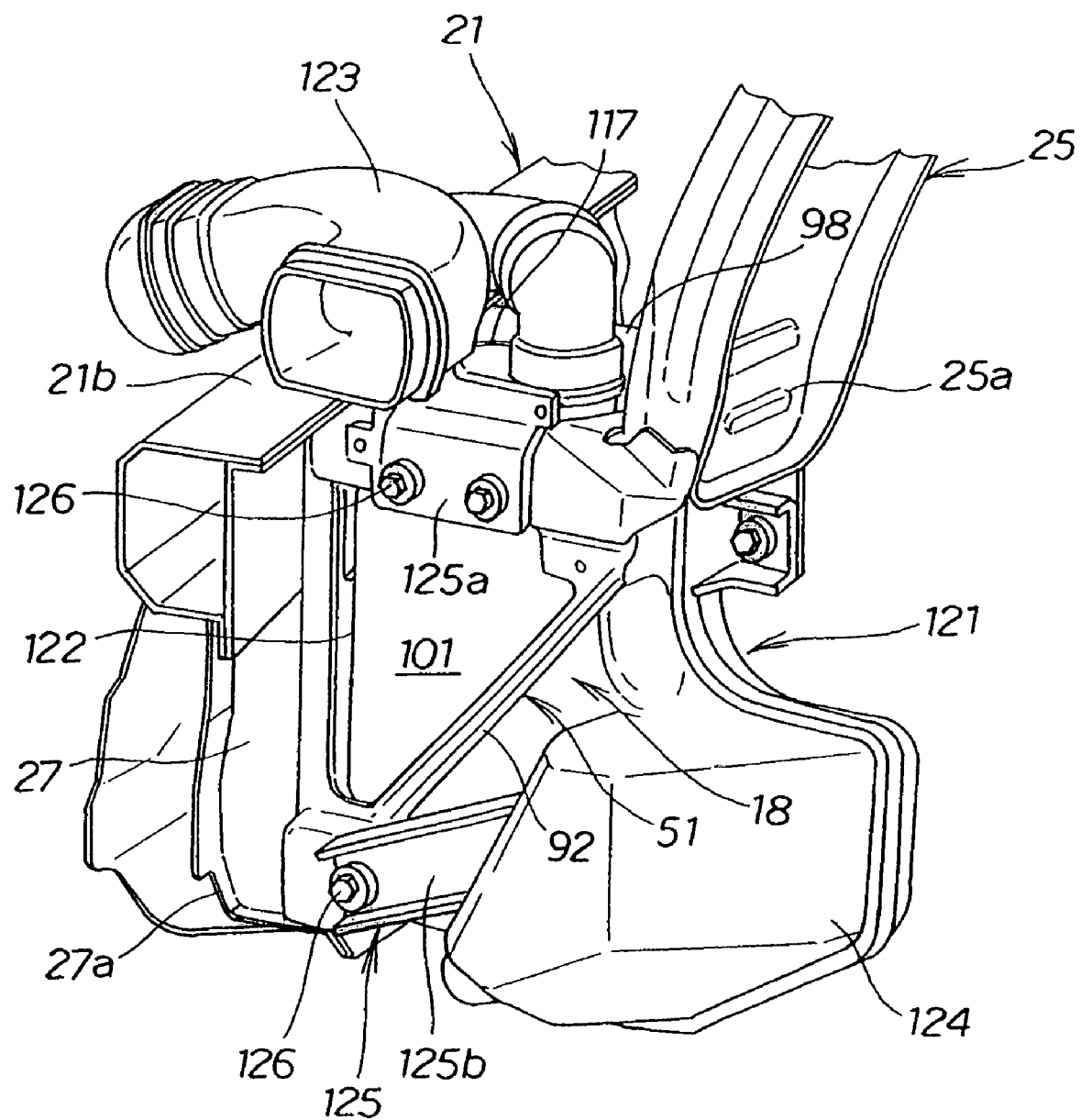
FIG. 10 is a view similar to FIG. 3, but showing the left triangular frame portion used to accommodate an intake duct according to a third embodiment of the present invention.

FIG. 10 shows a third embodiment of the present invention in which an intake duct 121 is disposed in the mount space 101 defined in the left frame section 18 of the vehicle front body structure. The intake duct 121 comprises a substantially rectangular duct body 122, an intake tube 123 for introducing outside air into the duct body 122, and a resonator 124 provided on the duct body 122. The duct body 122 is connected to the air-cleaner via a duct hose (not shown). The intake tube 123 extend upwardly from the duct body 122 through the opening 117 formed in the horizontal connecting member body 98. The duct body 122 is received in the mount space 101 defined in the left frame section 18 and mounted on a mount bracket 125. The mount bracket 125 includes an upper bracket member 125a and a lower bracket member 125b that are connected by fasteners including screws 126 to the left frame section 18 so that the intake duct 121 is immovably supported by the mount bracket 125 and the left frame section 18 in an embracing fashion.

Using the mount space 101 defined in the left frame section 18 obviates the need for the provision of a separate space for installation for the intercooler 111, which may enlarge the overall size of the vehicle body. Furthermore, since the mount bracket 125 is attached by the screws 126 to the left frame section 18 and since the mount bracket 115 and the left frame section 18 jointly support the intercooler 111 in an embracing manner, the left frame section 18 serves also as a mount bracket and hence contributes to the reduction of the number of components of the front vehicle body structure 10.

In the illustrated embodiments disclosed and described hereinabove, the left and right diagonal connecting members 51 and 53 are each formed by a pair of diagonal braces 92 and 96 spaced in a longitudinal direction of the vehicle body by a predetermined distance. The invention should by no means be limited to the illustrated embodiments but may include left and right diagonal connecting members each formed by a single diagonal brace. Furthermore, the left and right frame sections 18 and 19, the left and right connecting members 26 and 34 and the left and right front legs 27 and 35 may be variable in shape and configuration.

Obviously, various minor changes and modifications are possible in light of the above teaching. It is to be understood that within the scope of the appended claims the present invention may be practiced otherwise than as specifically described.

What is claimed is:

1. A vehicle front body structure for a motor vehicle, comprising:
  left and right front side frames extending in a longitudinal direction of a body of the vehicle;
  left and right front pillars disposed upwardly and rearward of the left and right front side frames;
  left and right upper members extending respectively from lower ends (24a, 31a) of the left and right front pillars to positions located outward of respective front end portions of the left and right front side frames in a widthwise direction of the vehicle body;
  left and right horizontal connecting members connecting together the front end portions of the left and right front side frames and front end portions of the left and right upper members;
  left and right legs extending vertically downward from the front end portions of the left and right front side frames;
  a sub-frame attached to lower end portions of the left and right legs;

left and right front suspensions connected to the sub-frame for supporting left and right front road wheels, respectively; and left and right diagonal connecting members extending diagonally between and connecting together the lower end portions of the left and right legs and the front end portions of the left and right upper members, wherein the left and right horizontal connecting members, the left and right legs and the left and right diagonal connecting members together form left and right frame sections of substantially triangular hollow prismoidal configuration having an axis extending in the longitudinal direction of the vehicle body.

2. The vehicle front body structure as recited in claim 1, wherein each of the left and right diagonal connecting members comprises a pair of diagonal braces spaced a predetermined distance in the longitudinal direction of the vehicle body.

3. The vehicle front body structure as recited in claim 2, further comprising a windshield washer tank installed in a mount space defined between the pair of diagonal braces.

4. The vehicle front body structure as recited in claim 2, further comprising an intercooler installed in a mount space defined between the pair of diagonal braces.

5. The vehicle front body structure as recited in claim 2, further comprising an intake duct installed in a mount space defined between the pair of diagonal braces.

6. The vehicle front body structure as recited in claim 1, further comprising a front bulkhead disposed between the front end portions of the left and right front side frames, the front bulkhead including left and right vertical stays connected to the front end portions of the left and right front side frames and the left and right legs.

7. The vehicle front body structure as recited in claim 1, wherein each of the left and right diagonal connecting members comprises a U-shaped connecting frame including a rectangular sidewall lying in a vertical plane parallel to a longitudinal axis of the vehicle body, and substantially triangular frame-shaped front and rear end walls extending perpendicularly from opposite vertical edges of the rectangular sidewall in a lateral outward direction of the vehicle body, each of the triangular frame-shaped front and rear end walls including a diagonal brace extending between and connected to the lower end portion of each of the left and right legs and the front end portion of each of the left and right upper members.

8. The vehicle front body structure as recited in claim 7, further comprising a windshield washer tank installed in a mount space defined between the diagonal braces of the triangular frame-shape front and rear end walls.

9. The vehicle front body structure as recited in claim 7, further comprising an intercooler installed in a mount space defined between the diagonal braces of the triangular frame-shape front and rear end walls.

10. The vehicle front body structure as recited in claim 7, further comprising an intake duct installed in a mount space defined between the diagonal braces of the triangular frame-shape front and rear end walls.

11. The vehicle front body structure as recited in claim 7, wherein each of the left and right legs has a generally hollow box-like configuration having one side open toward a lateral outward direction of the vehicle body, and the U-shaped connecting frame is connected to each of the left and right legs such that the open side of the hollow-box-like leg is closed by the sidewall of the connecting frame.

\* \* \* \* \*